US008318852B2

United States Patent
Kim et al.

(10) Patent No.: US 8,318,852 B2
(45) Date of Patent: *Nov. 27, 2012

(54) ACRYLIC PRESSURE-SENSITIVE ADHESIVE COMPOSITION FOR POLARIZING FILM

(75) Inventors: No Ma Kim, Daejeon (KR); Jeong Min Ha, Daejeon (KR); In Cheon Han, Seoul (KR); Seung Joon Park, Daejeon (KR); Woo Ha Kim, Gangwon-do (KR); Suk Ky Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 335 days.

This patent is subject to a terminal disclaimer.

(21) Appl. No.: 11/600,809

(22) Filed: Nov. 17, 2006

(65) Prior Publication Data

US 2007/0117918 A1    May 24, 2007

(30) Foreign Application Priority Data

Nov. 18, 2005 (KR) .................. 10-2005-0110857

(51) Int. Cl.
*C08L 33/10* (2006.01)
*C08L 33/00* (2006.01)
*C08L 33/04* (2006.01)
*C08L 33/08* (2006.01)
*C08L 31/04* (2006.01)

(52) U.S. Cl. ........ 524/523; 524/502; 524/515; 524/522; 524/524; 528/271; 528/392

(58) Field of Classification Search ............. 524/543, 524/556, 558, 560, 502, 515, 522, 523, 524; 528/271, 392

See application file for complete search history.

(56) References Cited

U.S. PATENT DOCUMENTS 6,646,050 B2 * 11/2003 Ohrui et al. ............. 525/123

FOREIGN PATENT DOCUMENTS

| JP | 60207101 | | 10/1985 |
| JP | 03012471 A | * | 1/1991 |
| JP | 10279907 | | 10/1998 |
| JP | 2002047468 | | 2/2002 |
| JP | 2003049141 | | 2/2003 |
| KR | 1998-079266 | | 11/1998 |
| WO | WO03070849 A1 | * | 8/2003 |

OTHER PUBLICATIONS

Abstract of JP 03-012471; Itano Noboru, Jan. 21, 1991.*
English translation of JP 03-012471; Itano Noboru, Jan. 21, 1991.*

* cited by examiner

*Primary Examiner* — Karuna P Reddy

(74) *Attorney, Agent, or Firm* — McKenna Long & Aldridge, LLP

(57) ABSTRACT

The present invention relates to an acrylic pressure sensitive adhesive composition comprising (meth)acrylic copolymers including alkyl(meth)acrylic acid ester monomer having 2~14 carbon atoms of alkyl group, characterized in that the gel fraction is 10~55%, the swelling ratio is 30~110, the weight average molecular weight of sol eluted from the final adhesive by ethyl acetate is at least 800,000, comprising low molecular weight molecule having the maximum 100,000 of weight average molecular weight by 10 ~40 wt % of the total sol component; and the above composition show excellent durability under a high temperature and/or humidity condition, and can improve the light leakage phenomenon and provide excellent operability at the time of manufacturing polarizer by effectively providing high modulus and stress release property.

13 Claims, 1 Drawing Sheet

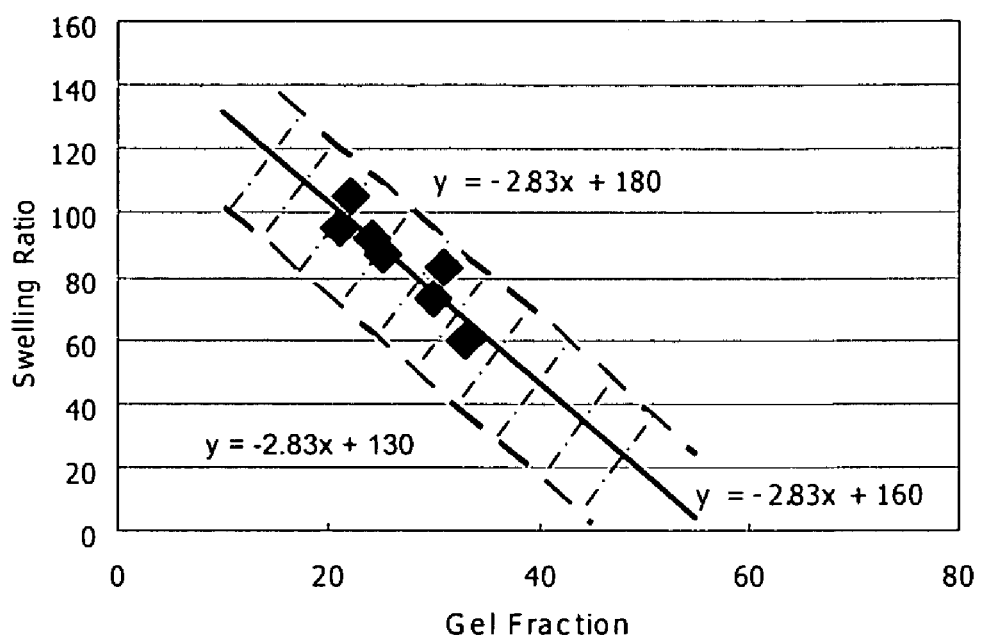

ACRYLIC PRESSURE-SENSITIVE ADHESIVE COMPOSITION FOR POLARIZING FILM

This application claims the benefit of Korean Patent Application No. 10-2005-0110857, filed on Nov. 18, 2005, which is hereby incorporated by reference for all purposes as if fully set forth herein.

TECHNICAL FIELD

The present invention relates to an acrylic pressure sensitive adhesive composition for polarizing film. Specifically, the present invention relates to an acrylic pressure sensitive adhesive composition, having excellent durability for long-term usage, providing acrylic pressure sensitive adhesive layers with effective stress release property enough to enhance low light leakage, and suppressing the protrusion of adhesive to minimize operability decrease of a polarizer.

BACKGROUND ART

Generally, to manufacture a liquid crystal display, a liquid crystal cell containing liquid crystal, and a polarizing film are basically required, and an adhesive layer, or a pressure-sensitive adhesive layer for adhering the two should be used. In addition, a phase retardation film, a compensation film for wide view angle, a brightness enhancement film, etc. may be further adhered to the polarizing film to improve performance of the liquid crystal display.

Typically, a liquid crystal display comprises a uniformly aligned liquid crystal layer; a multi-layer polarizing film comprising an adhesive layer or a pressure-sensitive adhesive layer; a phase retardation film; and additional functional film layers.

The polarizing film comprises a uniformly aligned iodine compound or dichroic polarizing material. To protect these polarizing elements, such protection film as triacetyl cellulose (TAC), etc. is used to constitute multi layers. The polarizing film may further comprise a phase retardation film having an anisotropic molecular alignment, or a compensation film for wide view angle such as a liquid crystal film.

The aforementioned films are made of materials having different molecular structures and compositions, and so have different physical properties. Especially, under a high temperature and/or humidity condition, the dimensional stability according to shrinking or expanding of materials having anisotropic molecular alignment is insufficient. As a result, if the polarizing film is fixed by a pressure-sensitive adhesive, a shear stress caused by shrinking or expanding of the polarizing film under a high temperature and/or humidity condition remains, whereby light leakage phenomenon occurs at a region on which the stress is concentrated.

To improve the light leakage phenomenon, it is needed to reduce the shrinkage of the polarizing film at a high temperature and/or humidity condition. However, it is very difficult to remove the stress generated from a liquid crystal panel to which a polarizing film consisted of materials having different physical properties is attached. Another method to improve the light leakage phenomenon is to provide stress release function to a pressure-sensitive adhesive layer to fix the polarizer to a liquid crystal panel. Generally, rubbers, acryls, and silicones are commonly used as pressure-sensitive adhesive. Among these, acrylic pressure-sensitive adhesives are advantageous in the pressure-sensitive adhesive property, optical property, durability, and weatherability, and so have been most widely used for manufacturing pressure-sensitive adhesive composition for polarizer.

A general design to provide a pressure-sensitive adhesive layer with stress release function is to design the pressure-sensitive adhesive layer to have large creep property and easy deformability. A representative method thereof is to provide a pressure-sensitive adhesive composition with durability and stress release function under a high temperature and high humidity condition by mixing a low molecular weight polymer having or not having a small amount of crosslinking functional group with a high molecular weight polymer having crosslinking functional group to be able to react with multifunctional crosslinking agent.

For example, Korea Patent Laid-open Publication No. 1998-079266 intended to solve the light leakage phenomenon by providing stress release property to a pressure-sensitive adhesive composition, comprising 100 parts by weight of a high molecular weight acrylic copolymer having a weight-average molecular weight of 1,000,000 or more, 20-200 parts by weight of a low molecular weight acrylic copolymer having a weight-average molecular weight of 30,000 or less, and 0.005-5 parts by weight of a multifunctional crosslinking agent.

Japan Patent Laid-open Publication No. 2002-47468 intended to provide stress-release function to a pressure-sensitive adhesive composition for polarizing film comprising 100 parts by weight of a high molecular weight acrylic copolymer having a functional group having a weight-average molecular weight of 800,000 to 2,000,000; 5-50 parts by weight of a low molecular weight acrylic copolymer having a weight-average molecular weight of 50,000 or less, and not having functional groups (the degree of dispersion=1.0 to 2.5); a crosslinking agent; and a silane compound.

Also, Japan Patent Laid-open Publication No. 2003-49141 intended to solve the light leakage phenomenon by providing stress release function to a pressure-sensitive adhesive composition for polarizing film comprising a high molecular weight acrylic copolymer having a weight-average molecular weight ranging from 1,000,000 to 2,000,000 and having functional groups; a medium molecular weight acrylic copolymer having a weight-average molecular weight ranging from 30,000 to 300,000 and having less than two functional groups; a low molecular weight acrylic copolymer having a weight-average molecular weight ranging from 1,000 to 20,000 (the degree of dispersion=1.0-2.5) and having no functional groups; and a crosslinking agent.

The above references employ the technical feature to soften a final pressure-sensitive adhesive to improve stress release property of the pressure-sensitive adhesive. That is, the pressure-sensitive adhesive was designed to release local stress resulted from shrinking or expanding of polarizer by increasing the creep property and making the deformation easy against outside stress, as the modulus of pressure-sensitive adhesive is reduced by a low molecular weight material added.

But, recently, the monitor size becomes larger, such as 19-23 inches for the computer monitor, and 40 inches or more for liquid crystal TV. Thus, the need for low light leakage phenomenon has been increased more. Accordingly, to realize better low light leakage property than the prior art, the amount of low molecular weight material in the pressure sensitive adhesives should be remarkably increased. In this case, the durability may be reduced under high temperature and/or humidity condition. Also, due to the large amount of low molecular weight material, severe protrusion of adhesive may occur when cutting the polarizer, and so the operability of polarizer may be significantly decreased.

Thus, there have been needs to develop a new adhesive for polarizing film improving the light leakage phenomenon and preventing the operability decrease of polarizer by minimizing the reduction of modulus of final pressure-sensitive adhesive, without compromising major characteristics of polarizing film products such as durability and reliability in long term usage as well as under a high temperature and humidity condition, and a polarizing film using the same.

DISCLOSURE OF THE INVENTION

To solve the problems in the prior art explained above, one object of the present invention is to provide an acrylic pressure sensitive adhesive composition improving the light leakage phenomenon through improvement of stress release property and preventing the operability decrease of polarizer by minimizing reduction of the modulus of pressure-sensitive adhesive, without compromising major characteristics of polarizing film products such as durability and reliability under a high temperature and/or humidity condition.

Another object of the present invention is to provide a polarizer using the acrylic pressure sensitive adhesive composition having the above characteristics.

Still, another object of the present invention is to provide a liquid crystal display comprising the polarizer prepared by the acrylic pressure sensitive adhesive composition having the above characteristics.

In order to achieve these objects, the present invention provides an acrylic pressure sensitive adhesive composition for polarizing film comprising acrylic copolymers including alkyl(meth)acrylic acid ester monomer having 2~14 carbon atoms of alkyl group, characterized in that the gel fraction represented by the following formula (1) is 10~55%, the swelling ratio represented by the following formula (2) is 30~110, and the weight average molecular weight of sol eluted from the adhesive by ethyl acetate is at least 800,000, and comprising a low molecular weight molecule having the maximum 100,000 of weight average molecular weight by 10~40 wt % in the total sol component:

$$\text{gel fraction}(\%) = B/A \times 100 \quad (1)$$

$$\text{swelling ratio} = C/B \quad (2)$$

wherein, A represents the weight of acrylic adhesive composition, B represents the dry weight of insoluble content of acrylic adhesive composition after dipping in ethyl acetate at ambient temperature for 48 hours, and C represents the weight of insoluble content which is swelled by ethyl acetate after dipping in ethyl acetate at ambient temperature for 48 hours (weight of insoluble content of acrylic adhesive composition+weight of permeated solvent).

Also, the present invention provides a pressure sensitive adhesive polarizer comprising the above acrylic pressure sensitive adhesive composition on one side or both sides of polarizing film as pressure sensitive adhesive layer.

Further, the present invention provides a liquid crystal display comprising liquid crystal panel in which a polarizer as prepared above is adhered to one side or both sides of liquid crystal cell.

The present inventors confirmed that the durability of final pressure sensitive adhesive can be maintained under high temperature and/or humidity condition by controlling relatively a small amount of low molecular weight material to exist in the non-crosslinking polymer, at the same time of making the final pressure sensitive adhesive have lower gel amount and less swelling ratio by controlling the gel content and swelling ratio of high molecular weight material forming a crosslinking structure. Also, the present inventors confirmed that the stress releasing property of the final adhesive can be enhanced significantly enough to improve the light leakage phenomenon and so the aggravation of cuttability of the final adhesive can be minimized, thereby completing the present invention.

The present invention is characterized in improving the light leakage phenomenon by increasing stress release property of a pressure-sensitive adhesive, with maintaining the durability under a high temperature and/or high humidity condition, and the modulus of final pressure-sensitive adhesive to a level of not having any problem in the operability of polarizer, by modulating gel content of final pressure-sensitive adhesive, swelling ratio, molecular weight of sol eluted by solvent, and molecular weight distribution.

Generally, the content of swelled gel by solvent (swelling ratio, Swelling Index) is greatly increased when final pressure-sensitive adhesive is modulated to have a low content of gel and dipped by solvent. The pressure-sensitive adhesive having such crosslinking structure forms a very loose crosslinking structure. Thus, the pressure-sensitive adhesive has excellent stress release property, and thus can improve the light leakage phenomenon since it has a high creep property and is easy to deform when the stress is applied from outside. However, the durability of the pressure-sensitive adhesive is very poor under a high temperature and high humidity condition.

Thus, the present inventors tried to solve the above problem, and discovered that a pressure-sensitive adhesive has excellent stress release property and can maintain the durability under a high temperature and high humidity condition if it is designed to have low gel content as well as low swelling ratio simultaneously, to complete the present invention. Although there is no theoretical limitation, the pressure-sensitive adhesive having both low gel content and low swelling ratio forms a relatively compact crosslinking structure, and can satisfy the stress release property and durability simultaneously since sols of the pressure-sensitive adhesive (free polymer having no crosslinking structure) link the above crosslinking structures each other. Therefore, it is very important to modulate the crosslinking structures in the present invention. If the gel content of the pressure-sensitive adhesive is similar but the crosslinking structure is compact, the durability can be significantly decreased since it is difficult for a polymer having no crosslinking structure to permeate between the crosslinking structures. On the contrary, when the crosslinking structure is too loose, the durability is decreased since the polymer having no crosslinking structure can easily permeate between crosslinking structures, but also can easily get out of the crosslinking structures when the stress is applied to the pressure-sensitive adhesive.

The pressure-sensitive adhesive for polarizer of the present invention can be applied to various adhesives or pressure-sensitive adhesive materials such as acrylics, silicones, rubbers, urethanes, polyesters, or epoxys, without limitation, but acrylic pressure-sensitive adhesive is preferable therein.

BRIEF DESCRIPTION OF THE DRAWINGS

FIG. 1 is a graph showing the relation between gel fraction and swelling ratio of the acrylic pressure sensitive adhesive composition according to one embodiment of the present invention.

BEST MODE FOR CARRYING OUT THE INVENTION

Hereinafter, the present invention will be described in more detail.

The present invention provides an acrylic pressure sensitive adhesive composition for polarizing film comprising acrylic copolymers including alkyl(meth)acrylic acid ester monomer having 2~14 carbon atoms of alkyl group, characterized in that the gel fraction represented by the following formula (1) is 10~55%, the swelling ratio represented by the following formula (2) is 30~110, and the weight average molecular weight of sol eluted from the adhesive by ethyl acetate is at least 800,000, and comprising a low molecular weight material having the maximum 100,000 of weight average molecular weight by 10~40 wt % in the total sol component.

In the acrylic pressure sensitive adhesive composition according to the present invention, the preferable gel fraction is 15~45%, and it is preferable that the gel fraction and swelling ratio satisfy the following formula (3):

$$-2.83x+130 \leq y \leq -2.83x+180 \qquad (3)$$

wherein x represents gel fraction, and y represents swelling ratio.

The gel content of the present acrylic adhesive composition is 10~55%, preferably 15~40%, more preferably 15~35%.

If the gel fraction is less than 10%, the durability under high temperature and/or humidity condition is very poor. If the above gel fraction is more than 55%, the stress release property of the pressure-sensitive adhesive is significantly decreased.

At the same time, the pressure sensitive adhesive composition in the present invention has 30~110 of swelling ratio measured by gel. If the swelling ratio is less than 30, the stress release property of the pressure-sensitive adhesive is not good enough since the crosslinking structure is too compact. And, if the swelling ratio is more than 110, the durability is decreased since the crosslinking structure is too loose.

And, the sol (non-crosslinking polymer) eluted by solvent (ethyl acetate) has at least 800,000 of weight average molecular weight, and at the same time, comprises a low molecular weight material having the maximum 100,000 of weight average molecular weight by 10~40 wt % in the total sol component in the GPC analysis.

Also, when the molecular weight of sol eluted by solvent is less than 800,000, the durability is not sufficient.

And, when the low molecular weight material having the maximum 100,000 of weight average molecular weight is less than 10 wt % of the total sol component, the enhancement of low light leakage is not significant, and in case of over 40 wt %, the durability is poor.

The acrylic pressure sensitive adhesive of the present invention is designed to have low gel content and less swelling ratio by controlling the gel content and swelling ratio of cross-linkable high molecular weight material, to enhance the stress release property and durability of the adhesive under high temperature and/or humidity condition. At the same time, the light leakage phenomenon can be remarkably enhanced through such improved stress release property by controlling the weight average molecular weight of non-crosslinking polymer to more than 800,000 wherein the low molecular weight material (the weight average molecular weight is less than 100,000) of non-crosslinking polymer is controlled to 10~40 wt %.

Preferably, the (meth)acrylic copolymers according to the present invention comprise 80~99.8 parts by weight of alkyl (meth)acrylic acid ester monomers having 2~14 carbon atoms of alkyl group, and 0.01 to 10 parts by weight of vinyl and/or acrylic cross-linkable monomers having carboxyl groups or hydroxy group which is cross-linkable with multi-functional crosslinking agent.

The above alkyl(meth)acrylic acid ester monomers having 2~14 carbon atoms of alkyl group may be ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, n-octyl(meth)acrylate, isooctyl(meth)acrylate, isononyl(meth)acrylate, lauryl(meth)acrylate, and tetradecyl(meth)acrylate. If the number of carbon atom of alkyl is not in the above range, the glass temperature (Tg) of the pressure-sensitive adhesive may be increased, or it may be difficult to modulate the adhesive property, and thus the above carbon number is limited to the range of 2~14. The above (meth) acrylic acid ester monomers may be used alone or in mixture thereof. To modulate the pressure-sensitive adhesive strength and cohesive strength, it is preferable to use 80~99.8 parts by weight of alkyl(meth)acrylic acid ester monomers having 2~14 carbon atoms of alkyl group.

Also, to modulate the adhesive strength and cohesive strength, the (meth)acrylic copolymers according to the present invention are copolymerized with vinyl and/or acrylic cross-linkable monomers having carboxyl group or hydroxy group which is cross-linkable with multifunctional crosslinking agent, one ore more selected from the group of 2-hydroxyethyl(meth)acrylate, 2-hydroxypropyl(meth)acrylate, 4-hydroxybutyl(meth)acrylate, 2-hydroxyethyleneglycol(meth)acrylate, 2-hydroxypropyleneglycol(meth)acrylate, acrylic acid, methacrylic acid, acrylic acid dimer, itaconic acid, maleic acid, or maleic anhydride.

Preferably, the content of vinyl and/or acrylic cross-linkable monomers comprising hydroxyl or carboxy which is cross-linkable with multifunctional crosslinking agent is 0.01 to 10 parts by weight of the total monomers since the adhesive strength and peel strength are decreased when the content is too high.

To modulate the glass transition temperature of the pressure-sensitive adhesive or provide some functionalities, the (meth)acrylic copolymers according to the present invention optionally comprise 0~20 parts by weight of vinyl monomer represented by following chemical formula (1):

[Chemical formula 1]

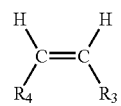

wherein $R_4$ represents hydrogen or alkyl, $R_3$ represents cyano, phenyl unsubstituted or substituted with alkyl, acetyloxy, or $COR_5$, wherein $R_5$ represents amino or glycidyloxy unsubstituted or substituted with alkyl.

Preferable alkyl in the definitions of $R_3$ to $R_5$ of the above formula is 1~6 carbon atoms of lower alkyl, more preferably methyl or ethyl.

The compounds of the above chemical formula (1) may be styrene monomers such as styrene or alpha methyl styrene; carboxylic acid vinyl esters such as vinyl acetate; or vinyl monomer having nitrogen atom such as (meth)acryl amide or N-butoxy methyl(meth)acryl amide. The preferable content of the above vinyl monomers is 20 or less parts by weight of the total monomers since the flexibility and peel strength are decreased when the content is too high.

The multifunctional crosslinking agent used to crosslink acrylic copolymer including alkyl(meth)acrylic acid ester monomer having 2~14 carbon atoms of alkyl group has a function to increase cohesive strength of the pressure sensitive adhesive by reacting with carboxyl and hydroxy group of acrylic polymer. The crosslinking agent can be selected from the group consisting of isocyanate, epoxy, aziridine, and metal chelate crosslinking agents.

Specifically, the isocyanate crosslinking agent may be tolylene diisocyanate, xylene diisocyanate, diphenylmethane diisocyanate, hexamethylene diisocyanate, isoform diisocyanate, tetramethylxylene diisocyanate, naphthalene diisocyanate, or their reactants with polyol like trimethylolpropane. The epoxy crosslinking agent may be ethyleneglycol diglycidylether, triglycidylether, trimethylolpropane triglycidylether, N,N,N'N'-tetraglycidylethylenediamine, or glycerine diglycidylether. The aziridine crosslinking agent may be N,N'-toluene-2,4-bis(1-aziridinecarboxide), N,N'-diphenylmethane-4,4'-bis(1-aziridinecarboxide), triethylenemelamine, bisisoprothaloyl-1-(2-methylaziridine), or tri-1-aziridinylphosphineoxide. The metal chelate crosslinking agent may be compounds prepared by coordinating multivalent metal such as Al, Fe, Zn, Sn, Ti, Sb, Mg, and V with acethylacetone or ethyl acetoacetate. The preferable content of multifunctional crosslinking agent is 0.01 to 10 parts by weight to 100 parts by weight of (meth)acrylic copolymers.

If the content is less than 0.01 part by weight, sufficient cohesion cannot be obtained, and the durability becomes weak. And, if the content is more than 10 parts by weight, the adhesive property is decreased, and easy peeling from the polarizing film may happen.

Also, the pressure-sensitive adhesive composition of the present invention may additionally include silane coupling agent which can enhance thermal/moisture resistance by improving pressure sensitive adhesive stability on a glass substrate. The silane coupling agent has a function to increase the stability of adhesive property when it is left for a long time under a high temperature and high humidity condition. The preferable content of silane coupling agent is 0.005-5 parts by weight to 100 parts by weight of acrylic copolymer. The silane coupling agent may be γ-glycydoxypropyl trimethoxysilane, γ-glycydoxypropyl methyldiethoxysilane, γ-glycydoxypropyl triethoxysilane, 3-mercaptopropyl trimethoxysilane, vinyl trimethoxysilane, vinyl triethoxysilane, γ-methacryloxypropyl trimethoxysilane, γ-methacryloxypropyl triethoxysilane, γ-aminopropyl trimethoxysilane, γ-aminopropyl triethoxysilane, 3-isocyanatepropyl triethoxysilane, or γ-acetoacetatepropyl trimethoxysilane. These silane coupling agents can be used alone or in mixture thereof.

In addition, the acrylic pressure sensitive adhesive composition of the present invention, if necessary, may further include tackifier. The preferable content of tackifier is 1-100 parts by weight to 100 parts by weight of acrylic copolymer. If the tackifier is excessively used, the compatibility or cohesive force of the adhesive may decrease. The tackifier may be a (hydrated) hydrocarbon resin, a (hydrated) rosin resin, a (hydrated) rosin ester resin, a (hydrated) terpene resin, a (hydrated) terpene phenol resin, a polymerized rosin resin, or a polymerized rosin ester resin. These tackifiers can be used alone or in mixture thereof.

Also, the acrylic pressure-sensitive adhesive composition of the present invention may further comprise a plasticizer, an epoxy resin, a hardener, etc., depending on purposes. Moreover, a UV stabilizer, an antioxidant, a colorant, a reinforcing agent, a filler, a defoaming agent, a surfactant, etc. may be properly added.

Further, the present invention relates to a process for preparing the acrylic pressure sensitive adhesive composition for polarizing film according to the present invention, comprising the steps of:

reacting alkyl(meth)acrylic acid ester monomer having 2~14 carbon atoms of alkyl group with vinyl and/or acrylic cross-linkable monomers having carboxyl group or hydroxy group which is cross-linkable with multifunctional crosslinking agent to prepare acrylic polymer for crosslinking structure;

reacting alkyl(meth)acrylic acid ester monomer having 2~14 carbon atoms of alkyl group to prepare acrylic polymer for non-crosslinking structure;

mixing the acrylic polymer for crosslinking structure and the acrylic polymer for non-crosslinking structure, and mixing the above mixture and the acrylic polymer of low molecular weight prepared by reacting alkyl(meth)acrylic acid ester monomer having 2~14 carbon atoms of alkyl group; or a process for preparing the acrylic pressure sensitive adhesive composition for polarizing film according to the present invention, comprising:

a first step of reacting alkyl(meth)acrylic acid ester monomer having 2~14 carbon atoms of alkyl group with vinyl and/or acrylic cross-linkable monomers having carboxyl group or hydroxy group which is cross-linkable with multifunctional crosslinking agent to prepare acrylic polymer for crosslinking structure; and a second step of reacting alkyl(meth)acrylic acid ester monomer having 2~14 carbon atoms of alkyl group to prepare acrylic polymer for non-crosslinking structure in the presence of acrylic polymer for crosslinking structure prepared in the first step; and a third step of mixing the polymer obtained from the second step and the low molecular weight of acrylic polymer prepared by reacting alkyl(meth)acrylic ester monomer having 2-14 carbon atoms of alkyl group.

The above process for preparing the acrylic pressure sensitive adhesive composition according to the present invention will be described in more detail below.

The above acrylic pressure-sensitive adhesive may be prepared by mixing two individual acrylic polymers, that is, preparing an acrylic polymer for crosslinking structure and an acrylic polymer for non-crosslinking structure, mixing them in a specific weight ratio or preparing two acrylic polymers in a reactor in order, mixing them with low molecular weight polymer, and reacting them with multifunctional crosslinking agent. Preferably, in case of the above high molecular weight polymer, the weight average molecular weight is ca. 1,000,000~2,500,000, and in case of low molecular weight polymer, it is ca. 3,000~100,000. If the weight average molecular weight of high molecular weight polymer is less than 1,000,000, the durability of pressure sensitive adhesive is decreased due to the low molecular weight. And, if the weight average molecular weight of high molecular weight polymer is more than 2,500,000, the stress release property of the pressure sensitive adhesive is decreased because of the high molecular weight. Further, if the weight average molecular weight of low molecular weight polymer is less than 3,000, the low molecular weight material would be eluted to the surface of adhesive, and the pressure sensitive adhesive property would be decreased. And, in the case of the weight average molecular weight of low molecular weight material is more than 700,000, sufficient stress release effect is hard to be expected.

The above acrylic polymer for crosslinking structure has to include cross-linkable functional group. If the amount of the cross-linkable functional group is excessive, the crosslinking structure is too compact for a polymer having no crosslinking structure to permeate between crosslinking structures, and thus the durability is significantly decreased, and the gel fraction and swelling ratio of the present invention cannot be achieved. On the contrary, if the amount of the cross-linkable functional group is less than a certain value, the crosslinking structure is too loose, and so the polymer having no crosslinking structure can easily permeate between crosslinking structures, but also can easily get out of them when a stress is applied to the pressure-sensitive adhesive, and so the durability is decreased. On the other hand, the acrylic polymer for crosslinking structure and the acrylic polymer for non-crosslinking structure are preferable to have similar composition since it is difficult to mix the two polymers completely if they have different composition. Also, a preferable cross-linkable functional group is hydroxy group, rather than carboxylic group, in mixing the two polymers. The acrylic polymer for non-crosslinking structure is preferable to have no cross-linkable functional group (hydroxy group or carboxylic group), but it may have cross-linkable functional group.

The acrylic copolymer of the present invention can be prepared by conventional methods such as solution polymerization, photo-polymerization, bulk polymerization, suspension polymerization, and emulsion polymerization, but solution polymerization is preferable. Here, it is preferable to set the polymerization temperature between 50-140° C., and to add an initiator after monomers are evenly mixed.

As the polymerization initiator, an azo-based polymerization initiator such as azobisisobutyronitrile and azobiscyclohexanecarbonitrile, or a peroxide such as benzoyl peroxide and acetyl peroxide may be used alone or a mixture thereof.

The preparation method of the pressure sensitive adhesive composition of the present invention having the above components is not specifically limited, and it can be obtained by mixing the above acrylic copolymer with a crosslinking agent by a common method.

In the mixing process to form the pressure sensitive adhesive layer, a crosslinking reaction of functional groups of a crosslinking agent should not be occurred for even coating. After the coating followed by dryness and aging, a crosslinking structure is formed, thereby obtaining the pressure sensitive adhesive layer having strong elasticity and cohesion.

Also, the present invention provides a polarizer containing the acrylic pressure sensitive adhesive composition as pressure sensitive adhesive layer of a polarizing film.

The polarizer of the present invention consists of a pressure sensitive adhesive layer formed from the above pressure sensitive adhesive composition on one side or both sides of the polarizing film. Polarizing film or polarizing device forming the above polarizer is not specifically limited.

For example, the preferable polarizing film may be prepared by adding a polarizing component such as iodine or dichroic dye onto polyvinyl alcohol resin film, followed by elongating. Also, there is no limitation in the thickness of polarizing film, and so the film may be made in conventional thickness. As polyvinyl alcohol resin, polyvinyl alcohol, polyvinyl formal, polyvinyl acetal and ethylene, saponified vinyl acetate copolymer, etc. may be used.

On both sides of the polarizing film, multilayer films may be formed, wherein the multilayer films are made by laminating protective films such as cellulose films like triacetyl cellulose, etc.; polyester films like polycarbonate film, polyethylene terephthalate, etc.; polyether sulphone films; polyolefin films having the structure of polyethylene or polypropylene, and polyolefine films having cyclo or norbornene structure, or ethylene propylene copolymer. The thickness of these protective films is not limited specifically, and conventional thickness may be accepted.

The method of forming the pressure sensitive adhesive layer on a polarizing film is not limited. The method may comprise the steps of coating the pressure sensitive adhesive directly on the surface of a polarizing film with Bar Coater, followed by drying. Or, the method may comprise the steps of coating the pressure sensitive adhesive on the surface of exfoliative substrate followed by drying, and transferring the pressure sensitive adhesive layer onto the surface of polarizing film, followed by aging.

The polarizer of the present invention can include one or more additional layers providing supplementary functions, such as protective layer, reflecting layer, anti-glare film, phase retardation film, compensation film for wide view angle, and brightness enhancing film.

The polarizer using the pressure sensitive adhesive of the present invention can be applied to all liquid crystal displays generally used now, and the kind of liquid crystal panel is not specifically limited. Preferably, the present invention may construct LCD to include liquid crystal panel connecting the pressure sensitive adhesive polarizer to one side or both sides of liquid crystal cell.

The acrylic pressure sensitive adhesive composition in the present invention can be used for industrial sheet, especially, protective film, reflective film, pressure sensitive adhesive film for structure, pressure sensitive adhesive film for picture, pressure sensitive adhesive film for marking traffic lane, pressure sensitive adhesive product for optical usage, and pressure sensitive adhesive agent for electronic components. Further, the present composition is also applicable to the fields having same operating features such as multi-layered laminated product, i.e. general commercial pressure sensitive adhesive sheet product, medical patch, and heat activated pressure sensitive adhesives.

Preferred embodiments of the present invention are illustrated through the following Examples. However, it should be appreciated that those skilled in the art may make modifications and improvements within the spirit and scope of the present invention.

EXAMPLE

Preparation Example 1

A monomer mixture of 98 parts by weight of n-butylacrylate (BA), and 2 parts by weight of 2-hydroxymethacrylate (2-HEMA) was put into a 1 L reactor equipped with a cooling system for reflux of nitrogen gas and easy regulation of temperature, and 120 parts by weight of ethyl acetate (EAc) were added thereto as solvent. To remove oxygen therefrom, nitrogen gas was purged for 60 min, during which the temperature was kept at 60° C., and then 0.03 part by weight of azobisisobutyronitrile (AIBN) was added thereto as reaction initiator after the mixture became homogenous. The mixture was reacted for 8 hours, and was diluted with ethyl acetate (EAc) to obtain acrylic copolymers (A-1) having 15 wt % of solids, 1,700,000 of weight average molecular weight, and 4.9 of molecular weight distribution.

Preparation Examples 2~6

As shown in Table 1, the high molecular weight acrylic copolymers were prepared by partially adding or partially not adding each component of the composition of the acrylic copolymers in the above preparation Example 1.

Preparation Examples 7~9

As shown in Table 1, the low molecular weight acrylic copolymers were prepared by partially adding or partially not adding each component of the composition of the acrylic copolymers in the above preparation Example 1.

Preparation Examples 10~12

As shown in Table 2, in the first reaction step, the high molecular weight acrylic copolymers having hydroxy group were prepared with the composition having hydroxy group under the same condition as Preparation Example 1. The second step composition as shown in Table 2 was added into the polymer prepared in the first step reaction, and the mixture was reacted under the same condition to prepare final high molecular acrylic copolymers.

TABLE 1

|  |  | Preparation Examples | | | | | | | | |
|---|---|---|---|---|---|---|---|---|---|---|
|  |  | High MW acrylic copolymer | | | | | | Low MW acrylic copolymer | | |
|  |  | 1<br>A-1 | 2<br>A-2 | 3<br>A-3 | 4<br>B-1 | 5<br>B-2 | 6<br>B-3 | 7<br>L-1 | 8<br>L-2 | 9<br>L-3 |
| Composition | n-BA | 98 | 98 | 99 | 100 | 100 | 100 | 100 | 100 | 100 |
|  | 2-HEMA | 2 | 2.5 | 1 | — | — | — | — | — | — |
|  | AIBN | 0.03 | 0.03 | 0.03 | 0.03 | 0.3 | 0.03 | 3 | 1.0 | 0.3 |
|  | EAc | 120 | 140 | 120 | 120 | 120 | 150 | 100 | 120 | 120 |
| Content of solid (wt %) | | 15 | 15 | 15 | 15 | 15 | 40 | 48 | 40 | 40 |
| Weight average MW (10,000) | | 170 | 130 | 160 | 170 | 50 | 105 | 1.5 | 8 | 50 |
| MWD | | 4.9 | 5.5 | 4.8 | 4.8 | 3.8 | 4.8 | 2.3 | 2.5 | 2.7 | n-BA: n-butylacrylate
AIBN: azobisisobutyronitrile
MW: molecular weight
2-HEMA: 2-hydroxymethacrylate
EAc: Ethyl acetate
MWD: molecular weight distribution

TABLE 2

|  |  | Preparation Examples | | |
|---|---|---|---|---|
|  |  | 10<br>C-1 | 11<br>C-2 | 12<br>C-3 |
| First step copolymer | n-BA | 19.6 | 19.5 | 19.3 |
|  | n-BA | 19.6 | 19.5 | 19.3 |
|  | 2-HEMA | 0.4 | 0.5 | 0.7 |
|  | AIBN | 0.006 | 0.006 | 0.006 |
|  | EAc | 24 | 30 | 40 |
|  | Weight average MW (10,000) | 170 | 130 | 130 |
|  | MWD | 4.9 | 4.4 | 4.4 |
|  | Conversion ratio (%) | 93 | 95 | 95 |
| Second step copolymer | n-BA | 80 | 80 | 80 |
|  | AIBN | 0.025 | 0.024 | 0.024 |
|  | EAc | 96 | 120 | 160 |
| Final high molecular weight acrylic copolymer | Weight average MW (10,000) | 165 | 123 | 83 |
|  | MWD | 4.9 | 5.1 | 5.1 |
|  | Conversion ratio (%) | 85 | 89 | 92 |

Example 1

To the mixture of 20 parts by weight of solids of high molecular acrylic copolymer (A-1), 80 parts by weight of solids of high molecular acrylic copolymer (B-1) prepared above and 20 parts by weight of solids of low molecular acrylic copolymer (L-2), 0.1 part by weight of tolylene diisocyanate adduct of trimethylolpropane(TDI-1) was added. The mixture was diluted properly, homogeneously mixed, coated on a releasing film, and dried to obtain an even pressure sensitive adhesive layer having 30 micron of thickness.

[Laminating Process]

185 micron thick iodine polarizer was coated with the pressure sensitive adhesive layer prepared above.

Examples 2~5 and Comparative Examples 1~6

The pressure sensitive adhesive layer was prepared and processed in the same manner as Example 1, except using the components and composition ratios as shown in Table 3

TABLE 3

|  |  | Examples | | | | | Comparative Examples | | | | | |
|---|---|---|---|---|---|---|---|---|---|---|---|---|
|  |  | 1 | 2 | 3 | 4 | 5 | 1 | 2 | 3 | 4 | 5 | 6 |
| High molecular material | A-1 | 20 | — | — | — | — | 20 | 20 | 20 | — | — | — |
|  | A-2 | — | 25 | 30 | — | — | — | — | — | 60 | — | — |
|  | A-3 | — | — | — | — | — | — | — | — | — | 100 | — |
|  | B-1 | 80 | 75 | — | — | — | 80 | 80 | 80 | — | — | — |
|  | B-2 | — | — | — | — | — | — | — | — | 40 | — | — |
|  | B-3 | — | — | 70 | — | — | — | — | — | — | — | — |
|  | C-1 | — | — | — | 100 | — | — | — | — | — | — | — |
|  | C-2 | — | — | — | — | 100 | — | — | — | — | — | — |
|  | C-3 | — | — | — | — | — | — | — | — | — | — | 100 |
| Low molecular material | L-1 | — | 20 | — | 20 | — | 50 | 5 | — | 20 | 30 | 15 |
|  | L-2 | 20 | — | 20 | — | 20 | — | — | — | — | — | — |
|  | L-3 | — | — | — | — | — | — | — | 30 | — | — | — |
| Crosslinking agent |  | 0.1 | 0.1 | 0.1 | 0.1 | 0.1 | 0.1 | 0.1 | 0.1 | 0.1 | 0.1 | 0.1 |

As shown in Table 4, the tests for sol (non-crosslinking polymer) analysis, gel fraction, swelling ratio, durability, light leakage (uniformness of light transmission), and protrusion were done by using the polarizer coated with the pressure sensitive adhesive prepared in the same manner as Examples 1~5 and Comparative Examples 1~6.

(Sol Analysis)

At the time of measuring the gel contents as shown above, by drying soluble contents by solvent (sol), the weight percentage of a polymer having a weight average molecular weight of less than 100,000 of total sol, and the weight average molecular weight were determined by gel permeation chromatography under the following conditions.

| Analytical instruments | Manufacturer: Waters Alliance System<br>Column: PL Mixed B type<br>Analyzer: Refractive index detector |
|---|---|
| Analytical conditions | Flux: 1 mL/min<br>Mobile phase: tetrahydrofuran<br>Column temperature: 40° C.<br>Sample concentration: 1 mg/mL<br>Sample amount: 200 μl |

(Gel Fraction)

The dried pressure sensitive adhesive in the above mixing process of Examples 1~5 and Comparative Examples 1~6 was left in a chamber having constant temperature and humidity (23° C. and 60% RH) for 10 days. 0.3 g of the pressure sensitive adhesive was poured into #200 of stainless steel mesh, which was dipped into 100 ml of ethyl acetate and stored in a dark room for 2 days at room temperature. After separating insoluble contents therefrom, the resulting adhesive was dried in an oven at 70° C. for 4 hours, and weighted.

(Swelling Ratio)

The swelling ratio was measured by dividing the weights of insoluble content and solvent included (swelled) in the insoluble contents by the dry weight of insoluble content, after separating the insoluble contents at the time of measuring the gel fraction.

(Durability)

The polarizer (90 mm×170 mm) coated with the pressure sensitive adhesive prepared in Examples 1~5 and Comparative Examples 1~6 was attached independently onto both sides of a glass substrate (110 mm×190 mm×0.7 mm) on which optical absorption axes were crossed. Here, approximately 5 kg/cm$^2$ of pressure was given in a clean room to prevent generation of bubbles and impurities. In order to evaluate the samples' humidity-resistance, the test samples were left in a relative humidity condition of 60° C. and 90% RH for 1000 hours to observe formation of bubbles or edge lifting. Also, in order to evaluate the heat-resistance of the samples, the test samples were left in 80° C. for 1000 hours to observe formation of bubbles or edge lifting. The test samples were further conditioned for 24 hours at room temperature before the evaluation was performed. Also, the reliability was evaluated in accordance with the above method after the polarizer coated with the pressure sensitive adhesive prepared in Examples 1~5 and Comparative Examples 1~6 were conditioned for 5 months or more. The durability was evaluated as follows:

o: No bubble or edge lifting was observed.
Δ: a few bubbles and a little edge lifting were observed.
X: a lot of bubbles or edge lifting was observed.

(Light leakage (uniformness of light transmission))

The light leakage of the samples as prepared above was evaluated by observing them with using a backlight system in a dark room. The polarizer coated with the pressure sensitive adhesive prepared in Examples 1~5 and Comparative Examples 1~6 (90 mm×170 mm) was attached onto a glass substrate (210 mm×210 mm×0.7 mm) in which the polarizer lies at right angle to the glass substrate, in order to measure the uniformness of light transmittance. The uniformness of light transmission was evaluated as follows:

⊙: Non-uniformness of light transmission was not observed by the naked eye.
o: Non-uniformness of light transmission was observed a little.
Δ: Non-uniformness of light transmission was observed some.
X: Non-uniformness of light transmission was observed a lot.

(Cuttability)

The polarizer coated with the pressure sensitive adhesive prepared in Examples 1~6 and Comparative Examples 1~6 was cut with a Thomson cutter. The cross section of the cut polarizer was observed and evaluated as follows:

3 point: the degree of adhesive protrusion of the cut side is acceptable (less than 0.2 mm).
2 point: the degree of adhesive protrusion of the cut side is rather not good (0.2~0.5 mm).
1 point: the degree of adhesive protrusion of the cut side is severe (more than 0.5 mm).

TABLE 4

|  | Examples | | | | | Comparative Examples | | | | | |
|---|---|---|---|---|---|---|---|---|---|---|---|
|  | 1 | 2 | 3 | 4 | 5 | 1 | 2 | 3 | 4 | 5 | 6 |
| Weight average MW (10,000) of sol | 140 | 140 | 90 | 135 | 100 | 110 | 140 | 140 | 50 | 82 | 63 |
| Polymer contents having less than 100,000 MW in total sol | 22 | 35 | 32 | 33 | 28 | 55 | 8 | 9 | 45 | 45 | 35 |
| Gel fraction (%) | 21 | 23 | 24 | 22 | 22 | 18 | 19 | 21 | 50 | 60 | 20 |
| Swelling ratio | 95 | 90 | 83 | 92 | 93 | 94 | 90 | 91 | 25 | 70 | 90 |
| Durability | ○ | ○ | ○ | ○ | ○ | Δ | ○ | ○ | X | Δ | X |
| Light leakage | ⊙ | ⊙ | ⊙ | ⊙ | ○ | ⊙ | Δ | Δ | ⊙ | Δ | ⊙ |
| Cuttability | 3 | 3 | 2 | 3 | 3 | 1 | 3 | 3 | 2 | 1 | 1 |

As shown in Table 4, Examples 1~5 confirmed that the present invention has good durability and good light leakage property, and the protrusion of the pressure-sensitive adhesive in the preparation process of the polarizer is very low. On the contrary, Comparative Example 1 shows lack of durability, wherein the content of low molecular weight material is beyond the present invention. In Comparative Examples 2 and 3, the enhancement of low light leakage is not significant, wherein the content of low molecular weight material is less than the content of this invention. In Comparative Example 4, the low light leakage is desirable, but the weight average molecular weight of sol is less than that of the present invention. And, the content of low molecular weight material is beyond the present invention, which results in significantly low durability. In Comparative Example 5 of improving the light leakage by mixing a large amount of low molecular weight material in the structure having a high content of gel, the enhancement effect was low compared with Examples 1~5, and the durability was poor due to the large amount of low molecular weight material. Further, it was confirmed that the protrusion became worse. In Comparative Example 6, wherein the weight average molecular weight of sol is less than 800,000, the durability was poor.

INDUSTRIAL APPLICABILITY

As described above, the present invention is effective for improving the light leakage phenomenon by releasing the stress resulted from shrinking of a polarizer during long term usage under a high temperature and/or humidity condition without compromising major characteristics such as durability. At the same time, the present invention has superior operability in decreasing protrusion of the pressure sensitive adhesive resulted from polarizer cutting.

Although the present invention has been described only with reference to specific examples, it should be understood that various changes and modifications can be easily made by a person having ordinary skill in the art without departing from the spirit and scope of the invention. Accordingly, it is natural that the following claims cover those changes and modifications.

What is claimed is:

1. An acrylic pressure sensitive adhesive composition for a polarizing film comprising:
    a high molecular weight acrylic polymer for crosslinking structure;
    a high molecular weight acrylic polymer for non-crosslinking structure;
    a low molecular weight acrylic polymer; and
    a multi-functional crosslinking agent,
    wherein an acrylic pressure sensitive adhesive made from the composition has a gel fraction represented by the following formula (1) of 10 to 55%,
    wherein the acrylic pressure sensitive adhesive has a swelling ratio represented by the following formula (2) of 30 to 110,
    wherein the weight average molecular weight of a sol is at least 800,000, the sol being eluted from the acrylic pressure sensitive adhesive,
    wherein the sol comprises 10 to 40 wt % of a low molecular weight material having the molecular weight of not more than 100,000,
    wherein the high molecular weight acrylic polymer for crosslinking structure has a weight average molecular weight of 1,000,000 to 2,500,000,
    wherein the high molecular weight acrylic polymer for non-crosslinking structure has a weight average molecular weight of 1,000,000 to 2,500,000,
    wherein the low molecular weight acrylic polymer has a weight average molecular weight of 3,000 to 100,000, wherein gel fraction (%)=$B/A$×100 (1), wherein swelling ratio=$C/B$ (2), wherein A represents the weight of the acrylic pressure sensitive adhesive, B represents the dry weight of insoluble content in the acrylic pressure sensitive adhesive after dipping it in ethyl acetate at ambient temperature for 48 hours, and C represents the weight of insoluble content swelled by ethyl acetate after dipping it in ethyl acetate at ambient temperature for 48 hours.

2. The acrylic pressure sensitive adhesive composition for polarizing film of claim 1, wherein the gel fraction is 15-45%.

3. The acrylic pressure sensitive adhesive composition for polarizing film of claim 2, wherein the gel fraction and swelling ratio satisfy the following formula (3):

$$-2.83x+130 \leq y \leq -2.83x+180 \quad (3),$$

wherein x represents gel fraction, and y represents swelling ratio.

4. The acrylic pressure sensitive adhesive composition for polarizing film of claim 1,
    wherein the high molecular weight acrylic polymer for crosslinking structure includes 80 to 99.8 parts by weight of alkyl(meth)acrylic acid ester monomers having 2-14 carbon atoms of alkyl group and 0.01 to 10 parts by weight of vinyl and/or acrylic cross-linkable monomers having carboxyl group or hydroxy group which is cross-linkable with multifunctional crosslinking agent.

5. The acrylic pressure sensitive adhesive composition for polarizing film of claim 4, wherein the alkyl(meth)acrylic acid ester monomers having 2-14 carbon atoms of alkyl group are one or more selected from the group consisting of ethyl (meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, n-octyl(meth)acrylate, isooctyl(meth)acrylate, isononyl(meth)acrylate, lauryl(meth)acrylate, and tetradecyl(meth)acrylate.

6. The acrylic pressure sensitive adhesive composition for polarizing film of claim 4, wherein the cross-linkable monomers are one or more selected from the group consisting of 2-hydroxyethyl(meth)acrylate, 2-hydroxypropyl(meth)acrylate, 4-hydroxybutyl(meth)acrylate, 2-hydroxyethyleneglycol(meth)acrylate, 2-hydroxypropyleneglycol(meth)acrylate, acrylic acid, methacrylic acid, acrylic acid dimer, itaconic acid, maleic acid, and maleic anhydride.

7. The acrylic pressure sensitive adhesive composition for polarizing film of claim 4, wherein the high molecular weight acrylic polymer for crosslinking structure further includes 20 or less parts by weight of copolymerizable vinyl monomers.

8. The acrylic pressure sensitive adhesive composition for polarizing film of claim 4, wherein the multifunctional crosslinking agent is one or more selected from the group consisting of isocyanate, epoxy, aziridine and metal chelate compounds.

9. The acrylic pressure sensitive adhesive composition for polarizing film of claim 1, wherein the composition further includes 0.005-5parts by weight of silane coupling agent, and 1-100 parts by weight of tackifier, based on 100parts by weight of the high molecular weight acrylic polymer.

10. The acrylic pressure sensitive adhesive composition for polarizing film of claim 1, wherein the composition further includes one or more additives selected from the group consisting of plasticizer, epoxy resins, hardener, UV stabilizers, antioxidants, coloring agents, reinforcing agents, fillers, antifoaming agents, and surfactants.

11. A pressure sensitive adhesive polarizer including the acrylic pressure sensitive adhesive composition of claim 1 on one side or both sides of polarizing film as pressure sensitive adhesive layer.

12. The pressure sensitive adhesive polarizer of claim 11, wherein the polarizer further includes one or more layers selected from the group consisting of protective layer, reflecting layer, phase retardation plate, compensation film for wide view angle, and brightness enhancing film.

13. A liquid crystal display including liquid crystal panel in which the polarizer of claim 11 or 12 is adhered to one side or both sides of liquid crystal cell.

* * * * *